Oct. 27, 1942.　　　　S. H. ERSHLER　　　　2,299,809
COFFEE URN
Filed April 26, 1939　　　3 Sheets-Sheet 2

INVENTOR
Samuel H. Ershler
BY
Emery, Varney, Whittemore & Dix
ATTORNEYS

Oct. 27, 1942.    S. H. ERSHLER    2,299,809
COFFEE URN
Filed April 26, 1939    3 Sheets-Sheet 3
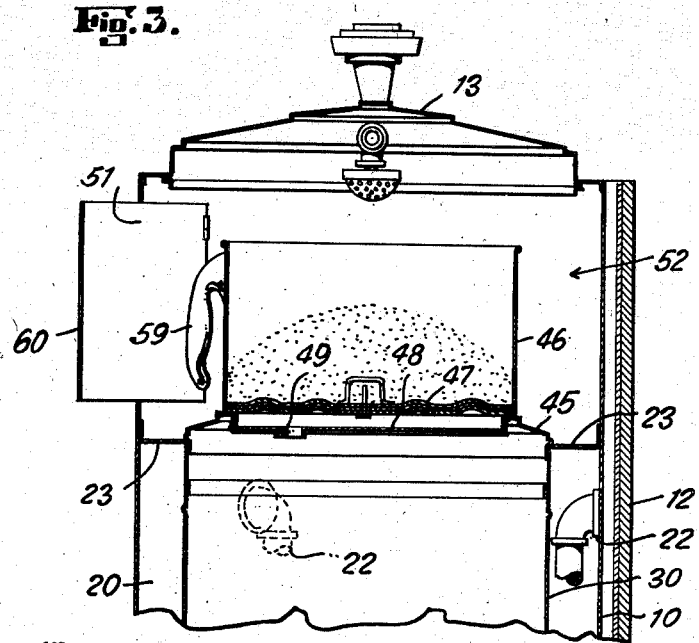
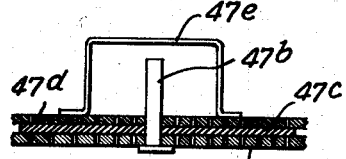
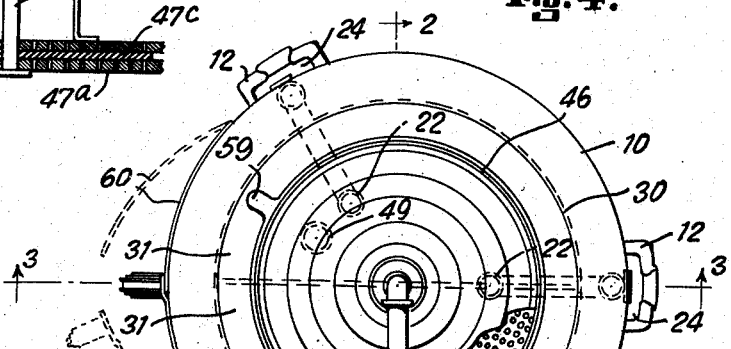
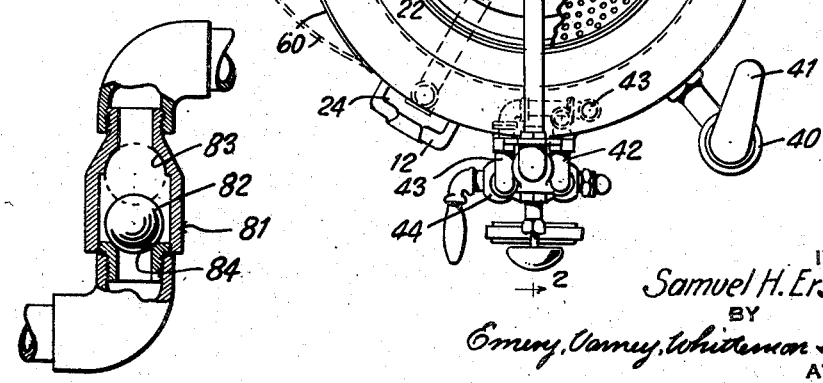
INVENTOR
Samuel H. Ershler
BY
Emery, Varney, Whiteman & Dix
ATTORNEYS Patented Oct. 27, 1942

2,299,809

UNITED STATES PATENT OFFICE 2,299,809

COFFEE URN

Samuel H. Ershler, Woodcliff, N. J.

Application April 26, 1939, Serial No. 270,083

5 Claims. (Cl. 53—3)

The present invention relates to coffee urns or coffee makers and has for an object the provision of improvements in this art.

The invention provides improved means for transferring hot water from a boiler compartment to the spray head in the coffee infusion compartment, whereby controlled and predetermined amounts of water are delivered at a substantially uniform temperature; it also provides means for automatically determining by a simple setting the amount of water delivered, whereby the attendant may go about other duties while the coffee is being made.

The invention also provides means of a simple and convenient form for selectively causing coffee infusions to flow to one or another of a plurality of jars, the selection being controlled from outside the device when the doors of the coffee infusion compartment are open, where visible and convenient and safe for the operator.

The invention also provides improved means for utilizing and disposing of heating gases, the gases being conducted through the boiler compartment and led away for discharge upwardly near the top of the device by convenient and neat appearing means.

The invention also provides improved means for the infusion compartment for catching the steam condensate which drips outside when the doors of the compartment are opened.

The invention also provides improved means for supplying water to and removing overflow water from the boiler compartment, and along with this provides means for supplying steam to and draining water from the interior jacket surrounding the coffee jars and preventing steam from escaping when adding boiler water.

The invention also provides an improved coffee basket construction.

The above-mentioned and other objects and features of the invention will best be understood from consideration of an exemplary embodiment of the invention shown in the accompanying drawings, wherein:

Fig. 3 is a partial vertical section taken on the line 3—3 of Fig. 4;

Fig. 4 is a top plan view with the cover removed;

Fig. 5 is a partial sectional view of the false bottom for the coffee basket; and Fig. 6 is a vertical section of a steam and water valve in the overflow outlet.

Figure 1:
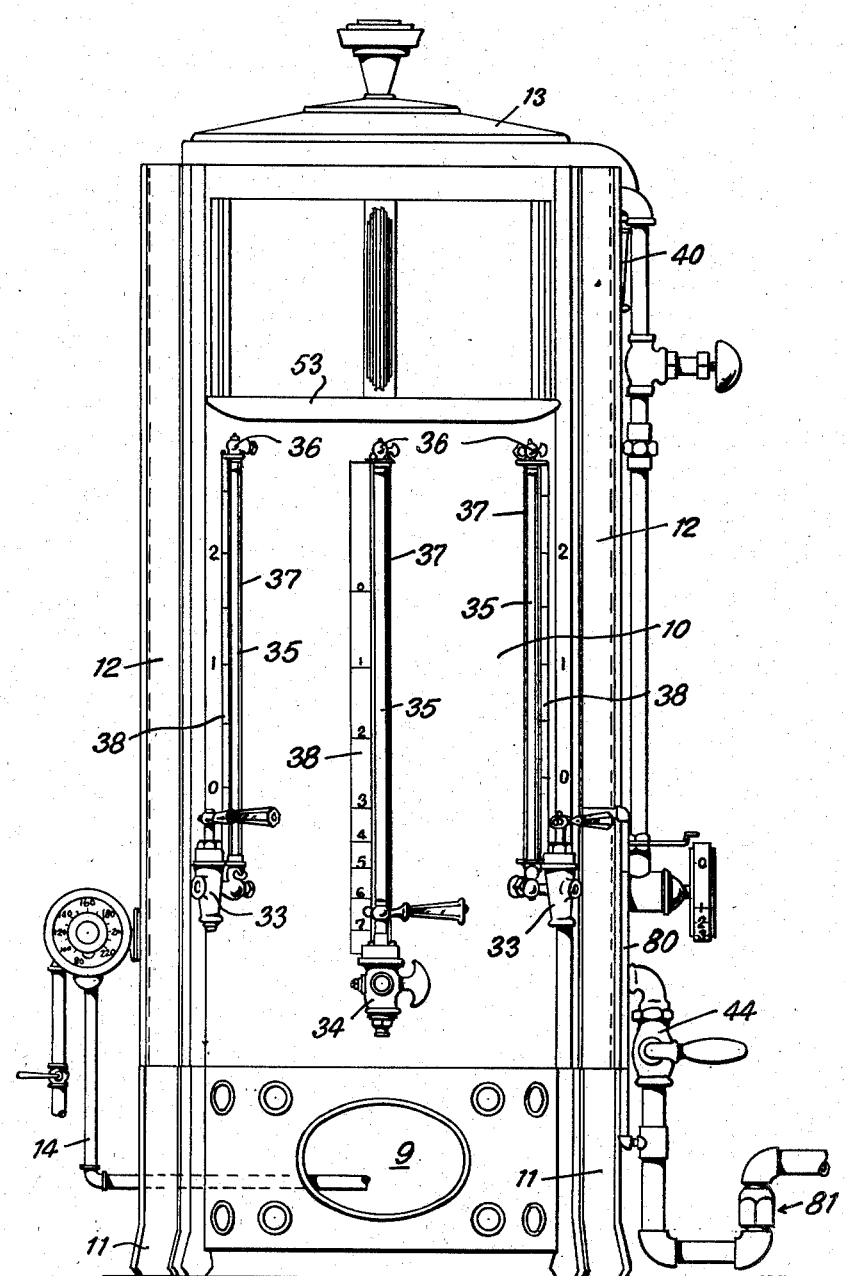
Fig. 1 is a front elevation of a coffee urn embodying the invention.

Referring to the drawings, an outer shell is generally indicated by the numeral 10 and is supported by a plurality of, for example three, legs 11. The legs extend upwardly into ornamental and strengthening pilasters 12. The shell is surmounted by a removable cover 13.

At the base there is provided a heating compartment 9 adapted to house suitable heating means, such as a gas burner (not shown) supplied by a gas pipe 14. A hand shut-off valve 15 and a thermal control device 16 may be provided in the gas line. The heating compartment may be separately enclosed as by a shell 17 provided with suitable hand, air, and vent openings.

Above the heating compartment there is located a water compartment or boiler 20 provided with a bottom 21. Hot gases from the heating compartment are largely carried off through a plurality of (three as shown) heating tubes 22 which are secured to the bottom 21 at their lower ends and to the side of the shell 10 just below the head 23 of the boiler at their upper ends. The hot tubes 22 assist in heating the water in the boiler. The tubes at their upper ends open into hollow spaces or flues 24 provided behind the pilasters 12. If desired the outer jackets of the pilasters may be spaced from or heat insulated from the flues 24 to avoid undue heating of the jackets. This avoids burning the attendants and prevents heat discoloration of the ornamental exterior finish.

Extending down into the boiler and forming part of the head thereof is an outer shell 30 for receiving one or a plurality of (two shown) coffee jars 31, preferably of glass or other vitreous material. Draw off pipes 32 extend from the bottom of the jars to cocks 33. A water cock 34 may also be provided for drawing water from the boiler. The usual sight gauge tubes 35, vent cocks 36, and tube protecting rods 37 are associated with the coffee and water cocks. Preferably scales 38 are provided alongside the glass sight gauge tubes to give quantitative readings of amounts. The water scale reads downward to indicate the amount of water drawn off from full condition and the coffee scales read upward to indicate the amount of coffee in the jars.

A boiler clean out closure 39 and a combination pressure and vacuum relief valve 40 with drain pipe 41 are provided. The boiler is also provided with a bottom fill and drain pipe 42, an overflow pipe 43, and a combination filling, drain and overflow valve 44. When the filling water valve is open the overflow is also open; after filling, both are closed. As shown in Fig. 4 the end of supply pipe 42 fits closely against the side of the overflow pipe 43. This serves two purposes. First, it throttles the inflow of cold water so it will require a relatively long time, say 10 minutes, to fill the boiler to avoid chilling the inner shell 30 around the coffee jars. And second, it chills the overflow pipe 43, thus reducing the outflow of steam from the overflow pipe by condensing it. Additional means for preventing the outflow of steam during filling, to supply steam to the coffee jar chamber, to drain condensate from the coffee jar, and to allow overflow water to flow out freely will be described hereinafter.

An enclosure frame 45 is disposed over the coffee jars and this supports the removable infusion basket or coffee maker 46. The basket is provided with a foraminous false bottom 47 and a solid bottom 48, the latter being formed with an opening 49. It will be understood that coffee will be placed on the mesh bottom 47 or on filter paper laid thereon and that hot water will be passed therethrough, as is usual.

Means provided for passing coffee from the basket opening 49 selectively to either coffee jar 31. Preferably these means are associated with or incorporated in the basket 46 and its support 45 as related to the disposition of the jars 31 and the basket opening 49. For example, the partition or adjacent sides of the jars may be aligned with the center of the front opening 51 of the infusion chamber 52; the support and basket are made circular for turning movement of the basket; and the opening 49 is placed off-center where it is free to be swung selectively over either basket 31. A handle 59 is secured on the basket in radial alignment with the opening 49 in order to give the operator a ready indication of the position of the opening 49. The basket bottom is offset to form a good seat and retaining mounting on the support 45.

The basket 46, by its handle 59, may be removed from the infusion chamber 52 through the front opening which is provided with hinged doors 60. A drip trough 53 extends substantially all the way across the front below the doors 60 to catch the condensate which drips down when the doors are opened. A drain tube may be provided if desired but normally the heat of the shell soon evaporates whatever water is caught.

Means are provided for supplying hot water to the coffee infusion basket 46 from the boiler, the means being preferably of such a nature as to supply accurately predetermined amounts of water so as to avoid overfilling even if not closely supervised by the attendant. The means employed provides convenience for manipulation, safety against burning the attendant, and freedom from spilled water outside the device, characteristic of most devices now in common use.

Figure 2:
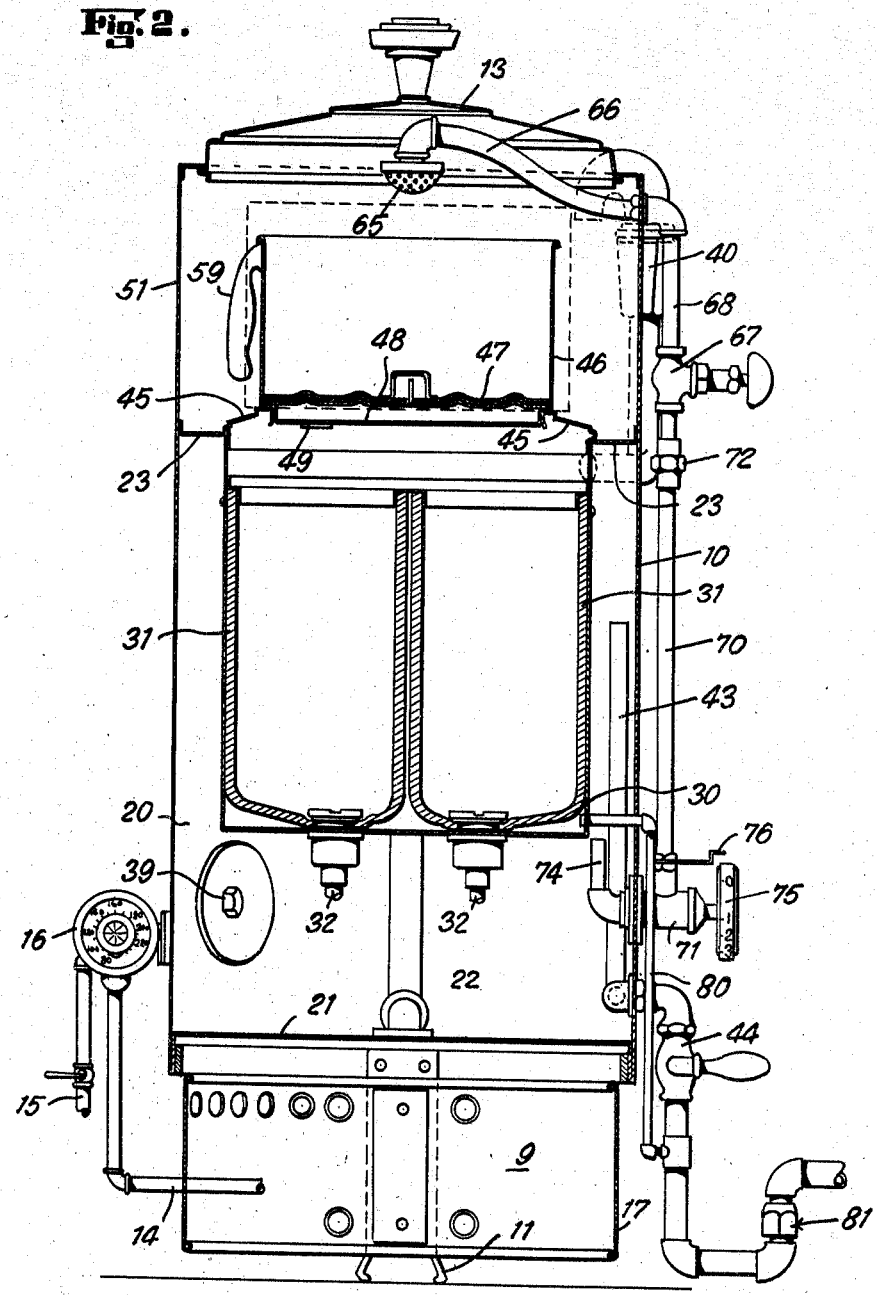
Fig. 2 is a vertical section taken on the line 2—2 of Fig. 4.

As shown in Figs. 2, 3 and 4, a spray head 65 secured to a supply pipe 66 is mounted in a raised position over the basket 46 to supply water thereto. The pipe 66 at its lower end is connected by a pipe 68 to a hand valve 67. The spray head 65 and the pipe 66 may be removed by unscrewing the pipe 66 from the pipe 68 when desired, as for removing the basket support 45 and the jars 31.

A pipe 70 leads from the valve 67 to a metering valve 71. If desired, a separable coupling 72 may be provided in the pipe 70.

The conical plug of the valve 71 has rigidly secured thereto a bent supply pipe 74 which is open at its outer end to supply water from whatever level it may be placed. The valve and pipe are operated by a hand piece 75 located outside the shell 10. A scale on the hand piece 75 indicates by reference to a fixed pointer 76 the amount of water which will be discharged from the full position at the upper end of the overflow pipe 43 when the end of the pipe 74 is in various positions. This scale corresponds to the scale 38 alongside the water gauge 35. The scale also is made to indicate the same units of volume as the scales 38 of the coffee gauges 35 whereby, knowing the amount of water required for the jars 31, the pipe 74 may be set to deliver exactly this amount, and the attendant's attention is not further required until after the desired amount of water has been delivered. This is accomplished with assurance that there will be no spilling. The conical shape of the valve and the permissible adjustment make it even more leak-proof and also provide friction sufficient to hold the pipe 74 securely in any adjusted position.

It will be clear that steam pressure existing in the boiler forces water therefrom up through the spray 65. This is often referred to as siphon filling, though it actually involves a pressure transfer instead of a true hydrostatic siphon transfer of fluid.

The valve 71 may stand open for 180 degrees from the top vertical to bottom vertical positions of the pipe 74; but may be entirely closed by turning the unported side of the valve plug (the other 180 degrees) across the valve casing ports. Suitable stops may be provided for conveniently limiting the movement of the valve plug.

The exact amount of water which passes out the pipe 74 will not ordinarily be delivered to the jars 31 because a certain amount will be retained in the coffee grounds but the attendant may make some allowance for this and, anyway it is a relatively small factor.

In operation, when the water in the boiler is low the attendant checks to see that the valve 71 is turned to the closed side. As a further safety measure the valve 67 is also kept closed except when supplying water to the spray head 65. He then opens the valve 44 to permit fresh water to enter through the pipe 42 and impinge against the overflow pipe 43 to cause escaping steam to condense therein. At the same time the operation of valve 44 opens the overflow pipe 43. The boiler fills slowly until the water reaches the top of the overflow pipe 43. The attendant hearing the overflow water falling in the catch pan in which the coffee maker rests, will then close the valve 44 thus shutting off the fresh water supply and closing the overflow pipe.

The water is then brought to a boil, which point may be readily noted by a thumping noise and the presence of steam at the relief valve 40. The water is now ready for making coffee. It is to be noted that the water has heated gradually as it slowly entered and the coffee in the jars which is kept ready to serve has not been unduly chilled; also that the water in the boiler is brought to a definite predetermined temperature each time, thus assisting in obtaining a uniform brew.

A basket of fresh coffee is placed in the infusion chamber 52 and the handle turned until the opening 49 is located over an empty jar. This will be when the handle of the basket is over the corresponding coffee gauge. Conveniently, stops are provided to limit the turning of the basket when the opening is in proper position.

Assuming that a three gallon jar is to receive two and one-half gallons of coffee; that it takes three gallons of water to fill the jar and supply the loss retained in the coffee grounds; and that the boiler is full to the top of the overflow pipe so that the water level in the water gauge 35 (the center gauge) stands at zero; the attendant turns the hand wheel 75 of the siphon valve 71 to the same reading as that registered on the water gauge, that is, in the present case, to zero. Whereupon, three gallons of water are delivered to the spray head 65 to make two and one-half gallons of water in the jar. When this amount is delivered the supply is automatically cut off and the spray head gives a hissing sound of escaping steam, which also appears at the front opening 51, to notify the attendant to close the valves 71 and 67.

Then if the other jar is to be filled, a fresh basket of coffee is introduced and the opening 49 placed over that jar. The level in the water gauge should read at three after three gallons have been supplied to the first jar. Assuming this reading, the hand wheel 75 is turned to three. Whereupon, three gallons of water will be delivered to the spray head 65 and two and one-half gallons of coffee made in the other jar. The water level will now stand at six and the boiler may be refilled. A reserve supply of water beyond the last figure on the gauge scale is maintained to avoid damage by overheating. The tube 74 is purposely made too short to reach the bottom of the boiler even if turned straight down.

The level of the coffee in the jars may be read directly from the two side gauges 35.

The coffee maker is provided with automatic stirrers or agitators fitted to the top gauge connections of each coffee indicator. These devices permit the agitation of the freshly brewed coffee to even out the consistency and insure uniformity. The devices may also be used to keep the coffee gauge glass tubes clean at all times, thereby avoiding the necessity of periodically cleaning them with the old style gauge glass brush. To accomplish this the cock at the top of the gauge is connected to a tube which leads into the top of the boiler. When the cock is opened it permits steam to blow through the glass tube and up through the coffee in the jar. When the cock is closed the coffee rises in the gauge to the level in the jar, a small opening being provided at the top of the gauge to allow entrapped steam and air to escape.

The details of the construction of the false bottom of the basket are shown in Fig. 5. Here it may be seen that a lower perforated plate 47a is provided with a pin 47b which extends through the filter paper 47c and the upper perforated plate 47d beneath a handle 47e secured to the plate 47d. The plates are thus readily separable to permit a sheet or sheets of filter paper to be placed between them but may readily be picked up together by the hand of the attendant because of the arrangement of the pin 47b and handle 47e.

As shown in Figs. 2 and 6, the overflow outlet pipe, below the valve 44 is provided with a small pipe 80 leading into the bottom of the shell or jacket 30 holding the coffee jars. As soon as the valve 44 is opened, steam is admitted through drain pipe 43 and the pipe 80 into the jacket around the coffee jars. Since the space around the tops of the jars is practically sealed, the steam will be retained around the jars to keep the coffee hot regardless of the inflow of cold water into the boiler around the shell 30. The pipe 80 also serves to drain water from the shell 30 when water from the boiler begins to flow out the overflow pipe 43 to cut off the steam. A cut-off valve may be provided for the pipe 80 if desired.

The overflow pipe 43 beyond the valve 44 and beyond the pipe 80 is provided with a valve 81 adapted to check the outflow of steam and permit the outflow of water. The valve includes a weighted closure such as a metal ball 82 and spaced upper and lower seats 83 and 84 respectively therefor. When the valve 44 is opened steam rushes out the overflow pipe 43 and raises the ball against its upper seat. It is held there while the boiler is filling, the escape of steam through pipe 80 not being great enough to lower the steam pressure enough to allow the ball to drop. If the steam pressure should be low enough to allow the ball to drop, the weight of the ball will hold the steam in.

However, when the water begins to overflow into the pipe 43 it will stop the flow of steam; and while the water will raise the ball from its lower seat, it will not hold it against its upper seat. Thus the overflow water can readily escape, whereas the steam cannot.

The upper seat of the valve may be made larger than the lower seat, thus allowing the ball to be held up by less pressure than that allowed to move it up. This compensates to some extent for the drop in steam pressure in the boiler as it fills with cold water. The valve 81 operates automatically and requires no attention.

It is thus seen that the operations are largely automatic and simplified whereby the attendant may devote himself to other tasks without ill results. Full condition of the boiler is manifested by the sound of water spilling in the drain pan; boiling temperature of the water is indicated by a tapping sound and the presence of steam at the relief valve; the position of the basket opening relative to the jar to be filled is indicated by the position of the handle of the basket relative to the coffee gauges and the sides of the door opening; the valve setting for filling a jar is made the same as the reading of the boiler water level gauge thus completely avoiding error even by the most unskilled operators; the full condition of the jars is indicated by the hissing of steam from the infusion spray head; the outflow of steam into the room from the water overflow pipe during filling is prevented, while at the same time steam is admitted around the coffee jars to keep them hot; the false bottom of the coffee basket permits ready replacement of filter paper and is easy to manipulate; the gas fumes are discharged through the pilaster outlets above the normal head level of attendants to avoid odors or injury; and the boiler water cannot all be discharged into the spray head, the tube 74 being too short to permit all the water to enter. The wide drip trough 53 prevents condensate from the doors running down the front of the casing to spoil its appearance.

The invention provides a coffee urn which is ornamental in appearance, convenient in use, safe for attendants, and sanitary in every way. Also in other ways, it is believed to constitute an advance in the art.

While one embodiment of the invention has been described, it is to be understood that the invention may be variously embodied within the limits of the prior art and the scope of the subjoined claims.

I claim:

1. A coffee urn comprising in combination a boiler, a coffee jar, a jacket around said jar, a water supply pipe for the boiler, an overflow pipe for said boiler, valve means for conjointly controlling the openings in said pipes, and delivery means extending from said overflow pipe and communicating with said jacket for delivering steam from the boiler to the jacket when the boiler is being filled, said delivery means being controlled by said valve means conjointly with the controlling of the openings in said pipes.

2. A coffee urn comprising in combination a boiler, a coffee jar, a jacket around said jar, a water supply pipe for the boiler, an overflow pipe for said boiler, valve means for conjointly controlling the openings in said pipes, and means extending from said overflow and communicating with said jacket for delivering steam from the boiler to the jacket through the overflow when the boiler is being filled and drawing water from said jacket when the water in the boiler enters the overflow, said means being controlled by the valve means conjointly with the controlling of the openings in said pipes.

3. A coffee urn comprising in combination a boiler, a coffee jar, a jacket around said jar, a water supply pipe for the boiler, an overflow pipe for said boiler, valve means for conjointly controlling the openings in said pipes, a check valve in said overflow pipe, and delivery means extending from said overflow pipe and communicating with said jacket, whereby upon admitting water to said boiler steam passes through said delivery means so as to heat said jacket and jar, but is prevented from escaping through said overflow by said check valve.

4. A coffee urn comprising in combination a boiler, a coffee jar, a jacket around said jar, a water supply pipe for the boiler, an overflow pipe for said boiler, valve means for conjointly controlling the openings in said pipes, a check valve in said overflow pipe beyond said valve means and a pipe having its upper end communicating with said jacket and its lower end communicating with said overflow between said valve means and said check valve, whereby upon admitting water to said boiler steam is delivered from said boiler to said jacket by means of said pipe so as to heat said jacket and jar, but is prevented from escaping out of said overflow by said check valve.

5. A coffee urn comprising in combination a boiler, a coffee jar, a jacket around said jar, an overflow pipe for said boiler, valve means controlling the opening in said pipe, a check valve in said overflow pipe, and delivery means extending from said overflow pipe and communicating with said jacket, said delivery means being controlled by said valve means conjointly with the controlling of the opening in said overflow, whereby upon opening the overflow pipe from said boiler steam passes through said delivery means so as to heat said jacket and jar, but is prevented from escaping through said overflow by said check valve.

SAMUEL H. ERSHLER.